United States Patent
Fujii

(10) Patent No.: US 11,137,521 B2
(45) Date of Patent: Oct. 5, 2021

(54) ANTIREFLECTIVE FILM-ATTACHED TRANSPARENT SUBSTRATE, AND DISPLAY APPARATUS USING SAME

(71) Applicant: AGC INC., Chiyoda-ku (JP)

(72) Inventor: Kensuke Fujii, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/129,281

(22) Filed: Sep. 12, 2018

(65) Prior Publication Data

US 2019/0079339 A1  Mar. 14, 2019

(30) Foreign Application Priority Data

Sep. 13, 2017  (JP) .............................. JP2017-175576

(51) Int. Cl.
  *G02B 1/115*  (2015.01)
  *G02F 1/1335*  (2006.01)
  *G02F 1/1333*  (2006.01)

(52) U.S. Cl.
  CPC ........ *G02B 1/115* (2013.01); *G02F 1/133308* (2013.01); *G02F 1/133502* (2013.01); *G02F 1/133331* (2021.01); *G02F 2201/38* (2013.01); *G02F 2203/11* (2013.01)

(58) Field of Classification Search
  CPC .............. G02B 1/115; G02F 1/133502; G02F 1/133308; G02F 2001/133331; G02F 2201/38; G02F 2203/11
  See application file for complete search history.

(56) References Cited

U.S. PATENT DOCUMENTS

| 7,782,537 | B2* | 8/2010 | Naito | G02B 1/105 |
| | | | | 359/642 |
| 8,128,225 | B2* | 3/2012 | Nishimoto | G02B 1/115 |
| | | | | 351/159.59 |
| 8,215,766 | B2* | 7/2012 | Nishimoto | C23C 14/5846 |
| | | | | 351/41 |
| 8,248,699 | B2* | 8/2012 | Terayama | G02B 1/115 |
| | | | | 359/581 |
| 8,778,483 | B2* | 7/2014 | Naito | B32B 27/40 |
| | | | | 428/212 |
| 8,882,280 | B2* | 11/2014 | Fukaya | G02B 1/11 |
| | | | | 359/507 |
| 9,423,529 | B2* | 8/2016 | Koyama | G02B 1/115 |

(Continued)

FOREIGN PATENT DOCUMENTS

| JP | 2015-19279 | 1/2015 |
| JP | 2017-049469 | 3/2017 |
| WO | WO2016-181983 | 11/2016 |

*Primary Examiner* — Bao-Luan Q Le
(74) *Attorney, Agent, or Firm* — Oblon, McClelland, Maier & Neustadt, L.L.P.

(57) ABSTRACT

Provided is an antireflective film-attached transparent substrate, including a transparent substrate having first and second principal surfaces and an antireflective film formed on the first principal surface of the transparent substrate, in which the antireflective film has a luminous reflectance being 1% or lower, and the antireflective film-attached transparent substrate has a transmittance being 85% or higher over the whole wavelength range of from 700 nm to 950 nm and has a reflectance being maximum in a wavelength range of from 750 nm to 900 nm in a reflection spectrum of a wavelength range of from 450 nm to 950 nm.

7 Claims, 4 Drawing Sheets

(56) References Cited

U.S. PATENT DOCUMENTS

| | | | | |
|---|---|---|---|---|
| 10,345,489 B2* | 7/2019 | Fukaya | ............... | C03C 17/3452 |
| 2009/0097129 A1* | 4/2009 | Naito | ..................... | G02B 1/105 |
| | | | | 359/653 |
| 2009/0239048 A1* | 9/2009 | Sugihara | ............ | G02B 27/0006 |
| | | | | 428/212 |
| 2009/0290219 A1* | 11/2009 | Terayama | .............. | G02B 1/115 |
| | | | | 359/586 |
| 2010/0177395 A1* | 7/2010 | Nishimoto | .......... | C23C 14/5846 |
| | | | | 359/601 |
| 2010/0225882 A1* | 9/2010 | Nishimoto | ............. | G02B 1/115 |
| | | | | 351/159.01 |
| 2010/0226005 A1* | 9/2010 | Nishimoto | ............. | G02B 1/115 |
| | | | | 359/359 |
| 2010/0279088 A1* | 11/2010 | Naito | ..................... | G02B 1/115 |
| | | | | 428/212 |
| 2011/0117345 A1* | 5/2011 | Nishimoto | ................ | B32B 7/02 |
| | | | | 428/216 |
| 2012/0008206 A1* | 1/2012 | Haga | .................... | G02B 5/0221 |
| | | | | 359/488.01 |
| 2012/0154916 A1* | 6/2012 | Nishimoto | ............. | G02B 1/115 |
| | | | | 359/580 |
| 2012/0276350 A1* | 11/2012 | Terayama | .............. | G02B 1/115 |
| | | | | 428/212 |
| 2013/0271836 A1* | 10/2013 | Fukaya | .................... | G02B 1/11 |
| | | | | 359/507 |
| 2013/0308196 A1* | 11/2013 | Koyama | ................. | G02B 1/11 |
| | | | | 359/601 |
| 2017/0090071 A1* | 3/2017 | Fukaya | ............... | C03C 17/3452 |
| 2017/0184762 A1* | 6/2017 | Fujii | ................... | C03C 17/3417 |
| 2017/0348944 A1* | 12/2017 | Sonoda | ..................... | B32B 7/02 |
| 2018/0038995 A1 | 2/2018 | Fujii et al. | | |
| 2018/0081085 A1* | 3/2018 | Ge | ........................ | G02B 1/115 |

\* cited by examiner

ANTIREFLECTIVE FILM-ATTACHED TRANSPARENT SUBSTRATE, AND DISPLAY APPARATUS USING SAME

TECHNICAL FIELD

The present invention relates to an antireflective film-attached transparent substrate, and a display apparatus using the same.

BACKGROUND

From the viewpoint of enhancing design appearance, a cover glass is placed in front of an image display apparatus such as a liquid crystal display (LCD) in many cases recently. In order to prevent external light from reflecting on a screen of the display apparatus, such a cover glass has often been provided with an antireflective film.

FIG. 1 illustrates one configuration example of a vehicle-mounted display apparatus with a cover glass placed in front of an LCD.

In a vehicle-mounted display apparatus 100 illustrated in FIG. 1, a cover glass 120 is stuck on the front of a liquid crystal display (LCD) 110 via a pressure-sensitive adhesive layer 130. The outside of the cover glass 120 is provided with an antireflective film 140. A peripheral edge of the inside of the cover glass 120 is provided with a light-blocking layer 150.

The vehicle-mounted display apparatus 100 illustrated in FIG. 1 is provided with an optical sensor 160 for switching a display surface, and the optical sensor 160 is arranged outside the liquid crystal display (LCD) 110 (Patent Document 1).

Patent Document 1: JP-A 2015-19279

SUMMARY

In recent years, the vehicle-mounted display apparatus may be provided with an infrared-ray (IR) sensor for responding to infrared rays in addition to the optical sensor for responding to visible light. In this case, it is desired to increase an infrared-ray transmittance in the cover glass. However, an antireflective film formed on the conventional cover glass has a low visible light reflectance and a high infrared-ray reflectance, that is, a low infrared-ray transmittance.

An object of the present invention is to provide an antireflective film-attached transparent substrate suitable for a cover glass of a vehicle-mounted display apparatus having an infrared-ray sensor, and to provide a display apparatus using the antireflective film-attached transparent substrate.

The antireflective film-attached transparent substrate according to one aspect of the present invention is an antireflective film-attached transparent substrate, including a transparent substrate having first and second principal surfaces and an antireflective film formed on the first principal surface of the transparent substrate, in which the antireflective film has a luminous reflectance being 1% or lower, and the antireflective film-attached transparent substrate has a transmittance being 85% or higher over the whole wavelength range of from 700 nm to 950 nm and has a reflectance being maximum in a wavelength range of from 750 nm to 900 nm in a reflection spectrum of a wavelength range of from 450 nm to 950 nm.

In the antireflective film-attached transparent substrate according to one aspect of the present invention, it is preferable that the antireflective film has a multilayer structure containing a high refractive index layer and a low refractive index layer provided alternately up to from four to ten layers in total, and each of the high refractive index layers and the low refractive index layers mainly contains at least one oxide selected from the group consisting of oxides of Si, Nb, Ti, Zr, Ta, Al, Sn, and In, or mainly contains at least one nitride selected from the group consisting of nitrides of Si and Al.

In the antireflective film-attached transparent substrate according to one aspect of the present invention, it is preferable that each of the high refractive index layers is a layer mainly containing an oxide of Nb and each of the low refractive index layers is a layer mainly containing an oxide of Si.

The antireflective film-attached transparent substrate according to one aspect of the present invention preferably further has an antifouling film on the antireflective film.

In the antireflective film-attached transparent substrate according to one aspect of the present invention, the transparent substrate is preferably a glass substrate.

The glass substrate is preferably a chemically-strengthened glass substrate.

The glass substrate preferably has an antiglare layer on the first principal surface of the glass substrate and the antireflective film is on the antiglare layer.

The antireflective film-attached transparent substrate according to one aspect of the present invention preferably has a light-blocking layer on a peripheral edge of the second principal surface of the transparent substrate, and at least a part of the light-blocking layer has a region with an internal transmittance being 80% or higher at a wavelength range of from 800 nm to 950 nm.

Another aspect of the present invention is a display apparatus containing the antireflective film-attached transparent substrate according to one aspect of the present invention, an infrared-ray sensor, and a display panel.

According to the antireflective film-attached transparent substrate of one aspect of the present invention, in the case of being used as a cover glass of a vehicle-mounted display apparatus having an infrared-ray sensor, a reflectance at a wavelength range of visible light can be decreased and a transmittance at a wavelength range of infrared light can be increased.

EMBODIMENTS

Figure 1:
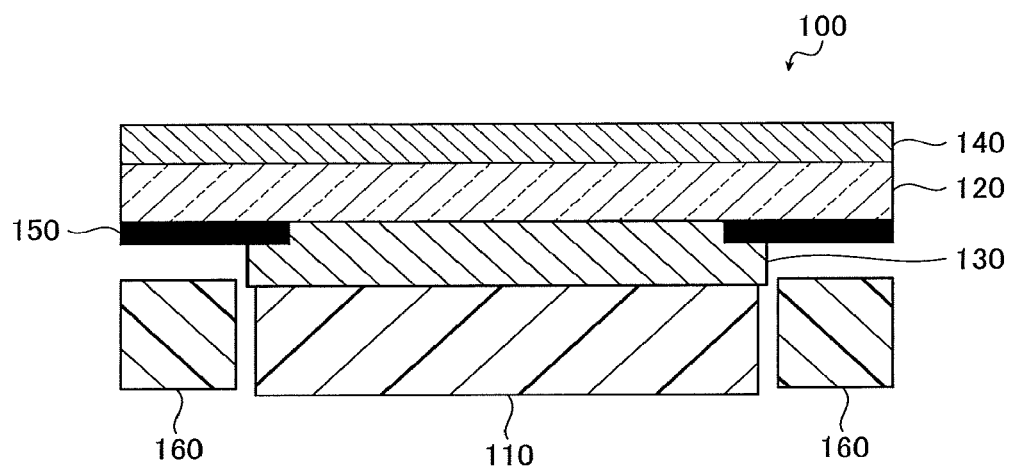
FIG. 1 is a cross-sectional diagram schematically illustrating one constitutional example of a vehicle-mounted display apparatus with a cover glass placed in front of an LCD.

Embodiments of the present invention will be described below in detail with reference to the drawings. Unless otherwise specified, optical properties in the present specification refer to values in a transparent region of an antireflective film-attached transparent substrate and do not refer to values in a region having a light-blocking layer.

One aspect of the present invention is an antireflective film-attached transparent substrate having an antireflective film on one of the principal surfaces of a transparent substrate.

In the antireflective film-attached transparent substrate according to the present invention, the antireflective film has a luminous reflectance of 1% or lower. In the case where the antireflective film-attached transparent substrate is used as a cover glass of an image display apparatus, the luminous reflectance of the antireflective film within the above-described range can provide a potent effect of preventing external light from reflecting on a screen of the display apparatus.

In the antireflective film-attached transparent substrate according to the present invention, the luminous reflectance of the antireflective film is preferably 0.8% or lower, and more preferably 0.6% or lower.

The luminous reflectance of the antireflective film can be measured by a procedure described in Examples described below.

The antireflective film-attached transparent substrate according to the present invention has a transmittance being 85% or higher over the whole wavelength range of from 700 nm to 950 nm. The wavelength range of from 700 nm to 950 nm is the wavelength range of infrared light normally used in an infrared-ray (IR) sensor. In the case where the transmittance is 85% or higher over the whole range of this wavelength range, sensitivity of the IR sensor is excellent.

The transmittance at the wavelength range of from 700 nm to 950 nm in the antireflective film-attached transparent substrate can be measured by a procedure described in Examples described below.

In the antireflective film-attached transparent substrate according to the present invention, the transmittance over the whole wavelength range of from 700 nm to 950 nm is preferably 87% or higher, and more preferably 90% or higher.

The antireflective film-attached transparent substrate according to the present invention has a reflectance being maximum in a wavelength range of from 750 nm to 900 nm in a reflection spectrum of a wavelength range of from 450 nm to 950 nm.

The reflection spectrum of a wavelength range of from 450 nm to 950 nm in the antireflective film-attached transparent substrate can be measured by a procedure described in Examples described below.

In the reflection spectrum of a wavelength range of from 450 nm to 950 nm, the reflectance mainly influencing the luminous reflectance is reflectance at the wavelength range of from 450 nm to 700 nm. As demonstrated in Comparative Examples 1 and 2 described below, a conventional antireflective film formed on a cover glass has a low luminous reflectance but a high reflectance in a wavelength range of from 700 nm to 950 nm (hereinafter also referred to as "IR region"). Therefore, an improvement in visibility by a decrease in the luminous reflectance cannot be compatible with an increase in a transmittance in the IR region. Also, when the luminous reflectance of the antireflective film is simply decreased, the reflectance at the wavelength range of from 700 nm to 950 nm becomes high and as a result, the transmittance cannot be set always at 85% or higher over the whole wavelength range of from 700 nm to 950 nm.

On the other hand, as demonstrated in Examples 1 to 3 described below, in the optical property where the reflectance has a maximum in the wavelength range of from 750 nm to 900 nm in the reflection spectrum of the wavelength range of from 450 nm to 950 nm, the decrease in the luminous reflectance can be compatible with the increase in the transmittance at the wavelength range of from 700 nm to 950 nm.

The antireflective film-attached transparent substrate having such an antireflective film can achieve the transmittance of 85% or higher over the whole wavelength range of from 700 nm to 950 nm while achieving the luminous reflectance of 1% or lower.

The anti reflective film-attached transparent substrate according to the present invention will be described below in further detail.

(Transparent Substrate)

The transparent substrate is not particularly limited as long as it is a transparent substrate having excellent translucency. Examples of such a transparent substrate include a resin substrate and a glass substrate. The transparent substrate is preferably a glass substrate from the viewpoint of strength and heat resistance.

As the glass substrate, glass having various compositions can be utilized. For example, the glass used in the present invention preferably contains sodium and preferably has a composition capable of being molded and being strengthened by a chemical strengthening treatment. Examples of such glass include aluminosilicate glass, soda-lime glass, borosilicate glass, lead glass, alkali-barium glass, and aluminoborosilicate glass.

The thickness of the glass substrate is not particularly limited. However, in order to effectively carry out a chemical strengthening treatment, in general, it is preferably adjusted to 5 mm or thinner, and more preferably 3 mm or thinner.

The glass substrate has preferably undergone a strengthening treatment for the purpose of heightening the strength of the cover glass. Examples of such a strengthening treatment include a chemical strengthening treatment and a physical strengthening treatment. In the case where the plate thickness of the glass substrate is thin, the glass substrate has preferably undergone a chemical strengthening treatment.

The glass substrate having undergone the strengthening treatment has a compressive stress layer on the surface. From the viewpoint of strength, the glass substrate having undergone the strengthening treatment has a compressive stress value (CS) of preferably from 300 MPa to 1,200 MPa. Also, from the viewpoint of enhancing durability to a scratch, the glass substrate having undergone the strengthening treatment has a depth of compressive stress (DOL) of preferably from 10 μm to 70 μm.

(Antireflective Film)

The antireflective film in the antireflective film-attached transparent substrate according to the present invention may have the above-described optical properties. In particular, the antireflective film can realize the optical properties suitably by the following constitution, which is thus preferable.

Figure 2:
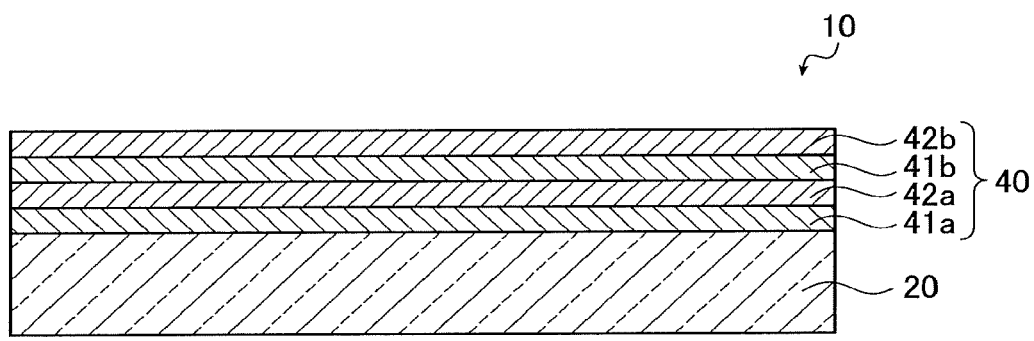
FIG. 2 is a cross-sectional diagram schematically illustrating one constitutional example of an antireflective film-attached transparent substrate.
Figure 3:
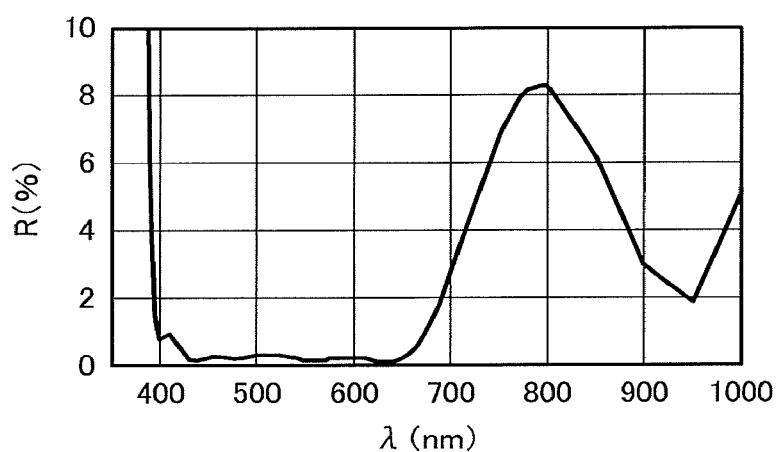
FIG. 3 is a reflection spectrum of Example 1
Figure 4:
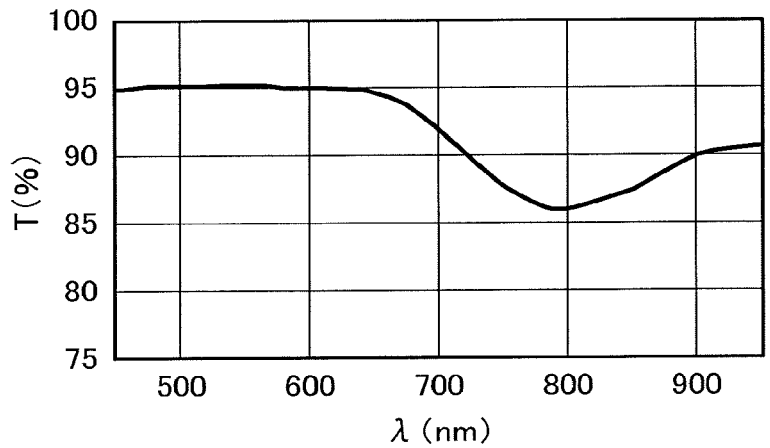
FIG. 4 is a transmission spectrum of Example 1.
Figure 5:
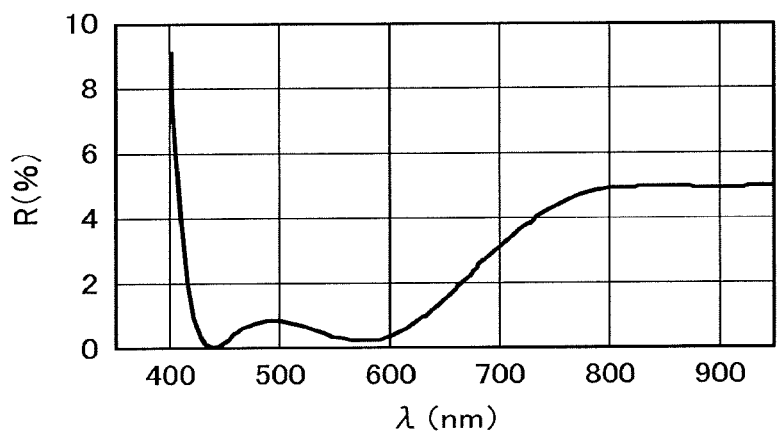
FIG. 5 is a reflection spectrum of Example 2.
Figure 6:
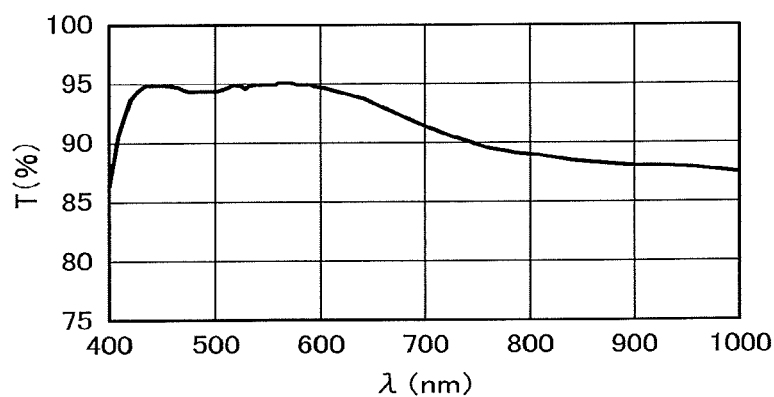
FIG. 6 is a transmission spectrum of Example 2.
Figure 7:
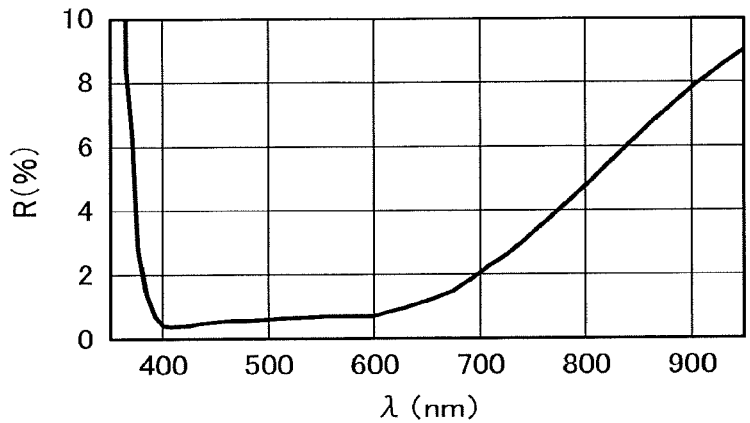
FIG. 7 is a reflection spectrum of Comparative Example 1.
Figure 8:
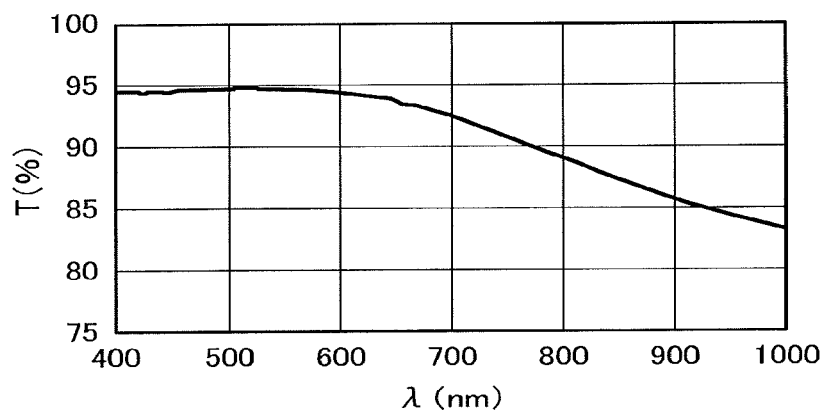
FIG. 8 is a transmission spectrum of Comparative Example 1.
Figure 9:
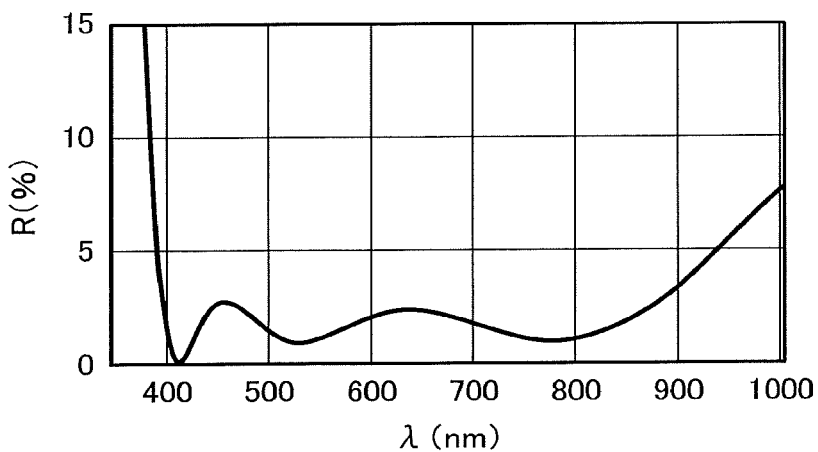
FIG. 9 is a reflection spectrum of Comparative Example 3.
Figure 10:
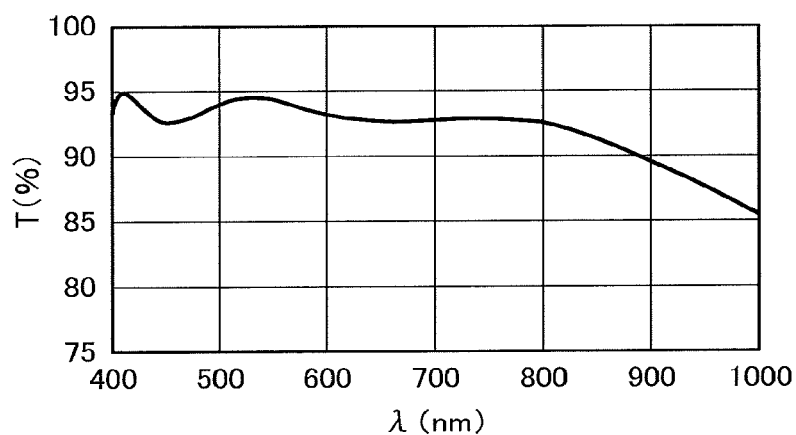
FIG. 10 is a transmission spectrum of Comparative Example 3.

FIG. 2 is a cross-sectional diagram schematically illustrating one constitutional example of the antireflective film-attached transparent substrate. In the antireflective film-attached transparent substrate 10 in FIG. 2, an antireflective film 40 is formed on a transparent substrate 20. The antireflective film 40 illustrated in FIG. 2 has a multilayer structure with a total of four layers including high refractive index layers 41a, 41b and low refractive index layers 42a, 42b alternately laminated. Reflection of light is suppressed by this multilayer structure.

Here, the term "high refractive index layer" in the present specification refers to a layer having a refractive index of higher than 1.6 at a wavelength of 550 nm for example, and the term "low refractive index layer" in the present specification refers to a layer having a refractive index of 1.6 or lower at a wavelength of 550 nm.

Each of the high refractive index layers 41a, 41b and the low refractive index layers 42a, 42b constituting the antireflective film 40 is preferably constituted mainly of at least one oxide selected from the group consisting of oxides of Si, Nb, Ti, Zr, Ta, Al, Sn, and In, or constituted mainly of at least one nitride selected from the group consisting of nitrides of Si and Al That is, constituents of the high refractive index layers 41a, 41b and constituents of the low refractive index layers 42a, 42b may be properly selected from the group described above so as to be a layer having the refractive index of higher than 1.6 at the wavelength of 550 nm and a layer having the refractive index of 1.6 or lower at the wavelength of 550 nm, respectively. Examples of such high refractive index layers include a layer constituted mainly of the oxide of Nb, a layer constituted mainly of the oxide of Ti, a layer constituted mainly of the oxide of Ta, and a layer constituted mainly of the nitride of Si. Examples of such low refractive index layers include a layer constituted mainly of the oxide of Si Among the high refractive index layers exemplified above, the layer constituted mainly of the oxide of Nb is preferable. Since the oxide of Nb can make the refractive index relatively high, and can increase a film formation rate in sputtering film formation, which leads to good productivity. Also, the oxide of Nb can be formed at a lower cost than those of the other oxides.

In the present specification, the term "mainly" indicates that the proportion of the oxide or nitride as mentioned above is 70% by mass or higher in the constituents of the high refractive index layers 41a, 41b and the low refractive index layers 42a, 42b.

Also, each of the high refractive index layers 41a, 41b and the low refractive index layers 42a, 42b may contain or may consist of only one kind of the oxides or nitrides as mentioned above, or may contain or may consist of two or more kinds thereof.

The antireflective film 40 illustrated in FIG. 2 has the four-layer structure in which the high refractive index layers 41a, 41b and the low refractive index layers 42a, 42b are alternately laminated, but the number of layers laminated is not limited to four. In the antireflective film 40, a total of the number of layers laminated is preferably from four to ten. That is, preferred are the multilayer structures ranging from that in which two high refractive index layers and two low refractive index layers are alternately laminated to that in which five high refractive index layers and five low refractive index layers are alternately laminated. In the case where a total of the number of layers laminated is less than four, it is difficult to achieve the antireflective film compatible between the luminous reflectance and the transmittance at the wavelength range of infrared light and also, it is difficult to adjust a color of the antireflective film. On the other hand, in the case where a total of the number of layers laminated is more than ten, the film thickness of the antireflective film is too thick and the film may be peeled off due to a film stress.

The two or more high refractive index layers constituting the multilayer structure described above may have the same refractive index with or different refractive indexes from each other. Similarly, the two or more low refractive index layers constituting the multilayer structure described above may have the same refractive index with or different refractive indexes from each other. Or, either the high refractive index layers or the low refractive index layers may have the same refractive index. In the case of a multilayer structure with four layers, the four-layer structure may be built up of a low refractive index layer, a high refractive index layer, a low refractive index layer, and a high refractive index layer in this order from the principal surface of the transparent substrate 20, or may be built up of a high refractive index layer, a low refractive index layer, a high refractive index layer, and a low refractive index layer in this order from the principal surface of the transparent substrate 20. The two low refractive index layers in either case may have the same refractive index, and the two high refractive index layers in either case may have the same refractive index.

The antireflective film 40 can be formed on the principal surface of the transparent substrate 20 by using a known film formation method such as a dry method or a wet method. Examples of such a dry method include a sputtering method, a vapor deposition method (PVD), and a chemical vapor deposition growth method.

In the antireflective film-attached transparent substrate 10 illustrated in FIG. 1 and FIG. 2, the antireflective film 40 may be formed on at least one of the principal surfaces of the transparent substrate 20, and the antireflective film may be provided on both of the principal surfaces of the transparent substrate.

The antireflective film-attached transparent substrate 10 according to the present invention may have a structure other than the above. For example, in order to make the surface of the antireflective film-attached transparent substrate 10 easily removing a strain, an antifouling film is preferably provided on the antireflective film 40. In order to enhance visibility by scattering external light, an antiglare layer is preferably provided. Furthermore, in order to increase decorative performance of the antireflective film-attached transparent substrate 10, a light-blocking part is preferably provided. Furthermore, a diffusion preventive layer for preventing diffusion of ions from the transparent substrate 20 to the antireflective film 40 may be provided between the transparent substrate 20 and the antireflective film 40 without impairing the optical properties of the antireflective film-attached transparent substrate 10.

(Antifouling Film)

An antifouling film can be constituted of, for example, a fluorine-containing organosilicon compound. Any of fluorine-containing organosilicon compounds can be used without particular limitations as long as they can impart antifouling properties, water repellency and oil repellency. Examples of such a fluorine-containing organosilicon compound include fluorine-containing organosilicon compounds having at least one group selected from the group consisting of fluoropolyether groups, fluoroalkylene groups and fluoroalkyl groups. Here, the term "fluoropolyether groups" refer to divalent groups having a structure containing a fluoroalkylene group(s) and an etheric oxygen atom(s) alternately bonding to each other. Also, the terms "fluoropolyether groups", "fluoroalkylene groups" and "fluoroalkyl groups" refer to polyether groups, alkylene groups and alkyl groups with at least one fluorine bonded to a carbon atom.

The antifouling film is preferably laminated on the antireflective film. In the case where the antireflective film is formed on both of the principal surfaces of the transparent substrate, the antifouling film can be formed on each of the antireflective films, or may be formed on only one of the antireflective films. This is because the antifouling film should be provided at least at the site having a possibility for contact with human fingers and the like. The site on which the antifouling film is provided can be chosen in response to its use applications and the like.

Examples of commercially available fluorine-containing organosilicon compounds having at least one group selected from the group consisting of fluoropolyether groups, fluoroalkylene groups and fluoroalkyl groups include KP-801 (trade name, a product of Shin-Etsu Chemical Co., Ltd.), KY178 (trade name, a product of Shin-Esu Chemical Co., Ltd.), KY-130 (trade name, a product of Shin-Etsu Chemical Co., Ltd.), KY-185 (trade name, a product of Shin-Etsu Chemical Co., Ltd.), OPTOOL (trademark) DSX and OPTOOL AES (both are trade names, products of DAIKIN INDUSTRIES, LTD.), and the like, which are preferable used.

(Antiglare Layer)

An antiglare layer is preferably provided on one of the principal surfaces of the transparent substrate. By forming the antiglare layer, external light can be scattered and thus, display performance of a display apparatus can be improved.

The antiglare layer can be formed by fixing particles having a light-scattering ability by a resin layer on the transparent substrate, or by forming a convex and concave shape by chemically treating a surface layer of the transparent substrate.

The convex and concave shape of the surface layer of the transparent substrate preferably has a surface roughness Ra (arithmetic mean roughness) of 0.01 μm or more. This can achieve a sufficient ability of scattering external light. On the other hand, the surface roughness Ra is preferably 5 μm or less. This can prevent the external light from being scattered excessively and can prevent the antireflective film-attached transparent substrate from looking white. The surface roughness Ra is preferably from 0.03 μm to 1 μm, and more preferably from 0.05 μm to 0.5 μm.

The convex and concave shape of the surface layer of the transparent substrate preferably has a surface roughness RMS (root-mean-square height) of from 0.01 μm to 1 μm. In the case where the surface roughness RMS is within the above-described range, compatibility between glare prevention and antiglare properties can be achieved. For the same reason, the surface roughness RMS is preferably from 0.03 μm to 0.7 μm, and more preferably from 0.05 μm to 0.5 μm.

The convex and concave shape of the surface layer of the transparent substrate preferably has a mean length RSm of a roughness curve element being from 1 μm to 50 μm. This can improve sharpness of light passing through the transparent substrate and further improve diffusivity of light reflected by the transparent substrate. For the same reason, RSm is preferably from 3 μm to 30 μm, and more preferably from 5 μm to 27 μm.

All the surface roughness Ra, surface roughness RMS and mean length RSm of the roughness curve element in the convex and concave shape of the surface layer of the transparent substrate are values measured in conformity with JIS B 0601 (2001).

In the case where the transparent substrate is a glass substrate, specific examples of the chemical treatment of forming the convex and concave shape on the surface layer of the glass substrate, include a method of etching the principal surface of the glass substrate, for example, a method of giving a frost treatment. The frost treatment can be carried out, for example, in such a manner that the glass substrate as a material to be treated is immersed in a mixed solution of hydrogen fluoride and ammonium fluoride, thereby chemically treating the immersed surface. Other antiglare treatment than the chemical treatment can be utilized. Examples thereof include a so-call sand blast treatment in which crystalline silicon dioxide powder, silicon carbide powder or the like is blown on the glass substrate surface with the aid of compressed air, and a physical treatment in which the glass substrate surface is polished with a brush which is with crystalline silicon dioxide powder, silicon carbide powder or the like and wetted with water.

(Light-Blocking Layer)

A light-blocking layer is preferably provided on the other principal surface of the transparent substrate. The light-blocking layer can provide a decoration to the antireflective film-attached transparent substrate. Also, design appearance of the whole display apparatus can be enhanced by preventing wiring of the display apparatus or the like from being visually recognized from the display surface side. The light-blocking layer is preferably formed on a peripheral edge of the other principal surface of the transparent substrate so that light can pass through a central region of the other principal surface of the transparent substrate. From the viewpoint described above, the light-blocking layer preferably has a high optical density (OD value) and a low luminous transmittance. Specifically, the OD value is preferably 4 or more.

In the case where a display apparatus has an IR sensor, at least a part of the light-blocking layer preferably has a region with a high transmittance at a wavelength region of 800 nm or higher.

Specifically, at least a part of the light-blocking layer preferably has a region with an internal transmittance at a wavelength range of from 800 nm to 950 nm being 80% or higher, more preferably 90% or higher, and further preferably 95% or higher. Such a constitution can be achieved by, for example, using two kinds of inks including a first ink (hereinafter referred to as "IR transmission ink") with a high transmittance at the wavelength range of from 800 nm to 950 nm in the cured state, specifically, ink having a transmittance at the wavelength range of from 800 nm to 950 nm being 80% or higher in the cured state, and a second ink with a low luminous transmittance in the cured state. Additionally, depending on the IR sensor used, at least a part of the light-blocking layer preferably has a high internal transmittance at a wavelength range longer than 950 nm. For example, the portion preferably has an internal transmittance being 80% or higher at wavelength range longer than 950 nm.

Examples of such ink with a low luminous transmittance include ink containing known coloring pigment or coloring dye. The ink with a low luminous transmittance preferably has a lower transmittance at the wavelength range of from 800 nm to 950 nm at the cured state than that of the IR transmission ink, specifically, preferably has a transmittance of lower than 80% at the wavelength range of from 800 nm to 950 nm in the cured state. Examples of such ink with a low luminous transmittance include titanium black and carbon black for black ink.

The light-blocking layer can be formed by a known printing method using ink having desired optical properties after curing. Examples of such a printing method include a screen printing method, an ink-jet method, a curtain coating method, and the like.

Also, the light-blocking layer may be formed by applying one kind of ink by only one layer, or applying one kind of ink by two or more layers, or applying two or more kinds of ink by two or more layers.

Furthermore, as described above, in order to provide a region with a high internal transmittance at the wavelength range of from 800 nm to 950 nm in at least a part of the light-blocking layer, a layer formed by using the IR transmission ink is preferably provided in the light-blocking layer.

Furthermore, the light-blocking layer may have a constitution having an IR transmission window by making the region on which an IR sensor is provided to have a higher transmittance at a wavelength region of 800 nm or higher, than that in the other region. In the case of forming the IR transmission window, the region other than the IR transmission window preferably has an OD value of 4 or more.

The IR transmission window can be obtained by, for example, a method in which the other principal surface of the transparent substrate is provided with a layer formed of the ink with a low luminous transmittance in a portion other than the IR transmission window and then, the portion of the IR transmission window is provided with a layer formed of the IR transmission ink. Also, the IR transmission window can be obtained by, for example, a method in which the other principal surface of the transparent substrate is provided with a layer formed of the IR transmission ink, a layer formed of the ink with a low luminous transmittance is laminated on this IR transmission ink layer such that only a predetermined region is not provided with the layer formed of the ink with a low luminous transmittance; a method of thinning the layer thickness of only a part of a layer formed of the ink with a low luminous transmittance; or the like. Moreover, the light-blocking layer may be provided with only one IR transmission window or a plurality of IR transmission windows.

In the case where the antireflective film-attached transparent substrate has the light-blocking layer, the transmittance at the wavelength range of from 700 nm to 950 nm and the reflection spectrum at the wavelength range of from 450 nm to 950 nm described above are values measured in a region without the light-blocking layer in the antireflective film-attached transparent substrate (Display Apparatus)

Figure 11:
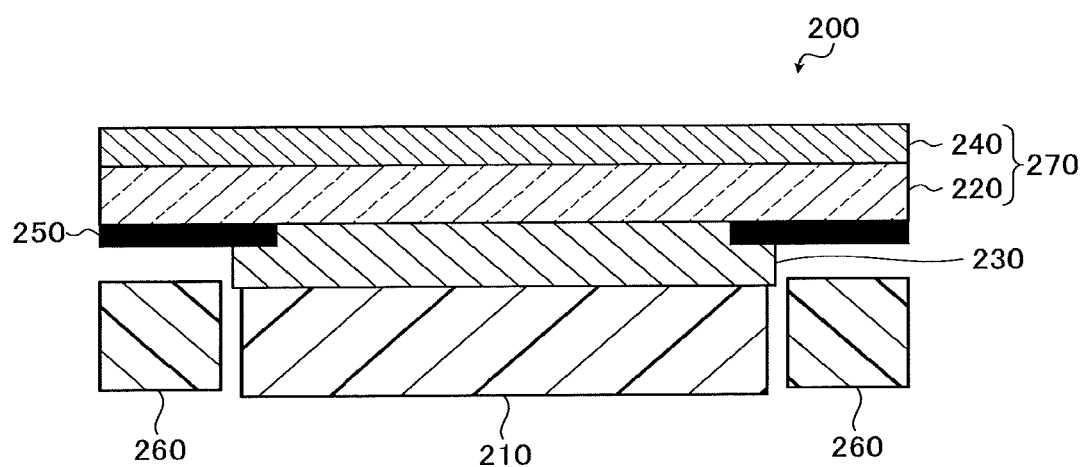
FIG. 11 is a cross-sectional diagram schematically illustrating one constitutional example of a display apparatus having an antireflective film-attached transparent substrate.

FIG. 11 is a cross-sectional diagram illustrating a display apparatus 200 of the present embodiment. Examples of the display apparatus 200 include display apparatuses such as a smartphone and a tablet terminal, vehicle-mounted display apparatuses such as a car navigation apparatus and a rear seat entertainment (RSE) apparatus for viewing video or the like by a crew of a rear seat, display apparatuses attached to a door of a household appliance such as a refrigerator, a washing machine and a microwave oven, and the like.

The display apparatus 200 includes a display panel 210, an IR sensor 260, and an antireflective film-attached transparent substrate 270. In FIG. 11, a transparent substrate 220 of the antireflective film-attached transparent substrate 270 is integrated with the display panel 210 through a pressure-sensitive adhesive layer 230. However, the display apparatus of the present invention is not limited to this form, and may be a form without using the pressure-sensitive adhesive layer for integration.

In the present embodiment, the display apparatus 200 has a housing (not illustrated) for receiving each part, and the display panel 210 and the IR sensor 260 are received inside the housing. Also, in the present embodiment, the display panel 210 is a liquid crystal panel, and the display panel 210 and a backlight unit (not illustrated) are received inside the housing.

In the display apparatus of the present invention, the display panel is not limited to the liquid crystal panel, and may be an organic EL panel, a plasma display panel (PDP), an electronic-ink panel, and the like. Accordingly, the display apparatus of the present invention may not include the backlight unit, depending on a kind of the display panel.

Furthermore, the display apparatus of the present invention may include a touch panel or the like (not illustrated). Examples of such a touch panel include a capacitance touch panel, and a resistance film touch panel.

Since the display apparatus 200 of the present embodiment has the antireflective film-attached transparent substrate of the present embodiment, in the transparent substrate, the reflectance at a wavelength range of visible light can be made low, and the transmittance at a wavelength range of infrared light can be made high. As a result, the display apparatus 200 of the present embodiment has good display performance and achieves high sensitivity of the lit sensor.

EXAMPLE

The present invention will be described in more detail with reference to the following Examples, but the present invention should not be construed as being limited to these Examples.

Example 1

An antireflective film-attached transparent substrate was prepared by forming an antireflective film on one of the principal surfaces of a transparent substrate in the following manner.

As the transparent substrate, a glass substrate for a chemical strengthening treatment, having dimensions of 50 mm long, 50 mm wide and 2 mm thick (Dragontrail, trademark, a product of Asahi Glass Co., Ltd.) was used.

The antireflective film having the following ten-layer structure was formed on one of the principal surfaces of the glass substrate for a chemical strengthening treatment, by using a magnetron sputtering method.

First layer: $Nb_2O_5$ layer (thickness: 14 nm)
Second layer: $SiO_2$ layer (thickness: 32 nm)
Third layer: $Nb_2O_5$ layer (thickness: 130 nm)
Fourth layer: $SiO_2$ layer (thickness: 35 nm)
Fifth layer: $Nb_2O_5$ layer (thickness: 18 nm)
Sixth layer: $SiO_2$ layer (thickness: 230 nm)
Seventh layer: $Nb_2O_5$ layer (thickness: 25 nm)
Eighth layer: $SiO_2$ layer (thickness: 33 nm)
Ninth layer: $Nb_2O_5$ layer (thickness: 37 nm)
Tenth layer: $SiO_2$ layer (thickness: 100 nm)

Example 2

An antireflective film-attached transparent substrate was prepared in the same manner as in Example 1, except that the multilayer structure of the antireflective film was changed to the following eight-layer structure.

First layer: $Nb_2O_5$ layer (thickness: 7 nm)
Second layer: $SiO_2$ layer (thickness: 35 nm)
Third layer: $Nb_2O_5$ layer (thickness: 12 nm)
Fourth layer: $SiO_2$ layer (thickness: 25 nm)

Fifth layer: Nb$_2$O$_5$ layer (thickness: 34 nm)
Sixth layer: SiO$_2$ layer (thickness: 23 nm)
Seventh layer: Nb$_2$O$_5$ layer (thickness: 129 nm)
Eighth layer: SiO$_2$ layer (thickness: 91 nm)

Example 3

An antireflective film-attached transparent substrate was prepared in the same manner as in Example 1, except that the multilayer structure of the antireflective film was changed to the following six-layer structure.
First layer: Nb$_2$O$_5$ layer (thickness: 13 nm)
Second layer: SiO$_2$ layer (thickness: 41 nm)
Third layer: Nb$_2$O$_5$ layer (thickness: 37 nm)
Fourth layer: SiO$_2$ layer (thickness: 22 nm)
Fifth layer: Nb$_2$O$_5$ layer (thickness: 131 nm)
Sixth layer: SiO$_2$ layer (thickness: 93 nm)

Comparative Example 1

An antireflective film-attached transparent substrate was prepared in the same manner as in Example 1, except that the multilayer structure of the antireflective film was changed to the following six-layer structure.
First layer: Nb$_2$O$_5$ layer (thickness: 10 nm)
Second layer: SiO$_2$ layer (thickness: 45 nm)
Third layer: Nb$_2$O$_5$ layer (thickness: 33 nm)
Fourth layer: SiO$_2$ layer (thickness: 28 nm)
Fifth layer: Nb$_2$O$_5$ layer (thickness: 31 nm)
Sixth layer: SiO$_2$ layer (thickness: 88 nm)

Comparative Example 2

An antireflective film-attached transparent substrate was prepared in the same manner as in Example 1, except that the multilayer structure of the antireflective film was changed to the following four-layer structure
First layer: Nb$_2$O$_5$ layer (thickness: 10 nm)
Second layer: SiO$_2$ layer (thickness: 40 nm)
Third layer: Nb$_2$O$_5$ layer (thickness: 120 nm)
Fourth layer: SiO$_2$ layer (thickness: 85 nm)

Comparative Example 3

An antireflective film-attached transparent substrate was prepared in the same manner as in Example 1, except that the multilayer structure of the antireflective film was changed to the following four-layer structure
First layer: Nb$_2$O$_5$ layer (thickness: 25 nm)
Second layer: SiO$_2$ layer (thickness: 20 nm)
Third layer: Nb$_2$O$_5$ layer (thickness: 125 nm)
Fourth layer: SiO$_2$ layer (thickness: 90 nm)

The following evaluations were carried out on the antireflective film-attached transparent substrate prepared as mentioned above.

(Luminous Reflectance of Antireflective Film and Luminous Transmittance of Antireflective Film-Attached Transparent Substrate)

A reflection spectrum and a transmission spectrum were measured by using a spectrophotometer (manufactured by Shimadzu Corporation, trade name: SolidSpec-3700).

A luminous reflectance was determined as a stimulus value Y of reflection, defined in JIS Z 8701. In this case, a D65 light source was used as a light source, and a view angle was set 10°.

The transmission spectrum was obtained based on JIS Z 8701. The light source used was the D65 light source. Minimum value $T_{min}$ of the transmittance in the wavelength range of from 700 nm to 950 nm in the transmission spectrum is shown in Table 1.

Wavelength $\lambda_{max}$ at which the reflectance becomes maximum in the wavelength range of from 450 nm to 950 nm in the reflection spectrum is shown in Table 1.

TABLE 1

|  | Example 1 | Example 2 | Example 3 | Comparative Example 1 | Comparative Example 2 | Comparative Example 3 |
|---|---|---|---|---|---|---|
| Structure | Glass<br>Nb$_2$O$_5$ (14 nm)<br>SiO$_2$ (32 nm)<br>Nb$_2$O$_5$ (130 nm)<br>SiO$_2$ (35 nm)<br>Nb$_2$O$_5$ (18 nm)<br>SiO$_2$ (230 nm)<br>Nb$_2$O$_5$ (25 nm)<br>SiO$_2$ (33 nm)<br>Nb$_2$O$_5$ (37 nm)<br>SiO$_2$ (100 nm) | Glass<br>Nb$_2$O$_5$ (7 nm)<br>SiO$_2$ (35 nm)<br>Nb$_2$O$_5$ (12 nm)<br>SiO$_2$ (25 nm)<br>Nb$_2$O$_5$ (34 nm)<br>SiO$_2$ (23 nm)<br>Nb$_2$O$_5$ (129 nm)<br>SiO$_2$ (91 nm) | Glass<br>Nb$_2$O$_5$ (13 nm)<br>SiO$_2$ (41 nm)<br>Nb$_2$O$_5$ (37 nm)<br>SiO$_2$ (22 nm)<br>Nb$_2$O$_5$ (131 nm)<br>SiO$_2$ (93 nm) | Glass<br>Nb$_2$O$_5$ (10 nm)<br>SiO$_2$ (45 nm)<br>Nb$_2$O$_5$ (33 nm)<br>SiO$_2$ (28 nm)<br>Nb$_2$O$_5$ (31 nm)<br>SiO$_2$ (88 nm) | Glass<br>Nb$_2$O$_5$ (10 nm)<br>SiO$_2$ (40 nm)<br>Nb$_2$O$_5$ (120 nm)<br>SiO$_2$ (85 nm) | Glass<br>Nb$_2$O$_5$ (25 nm)<br>SiO$_2$ (20 nm)<br>Nb$_2$O$_5$ (125 nm)<br>SiO$_2$ (90 nm) |
| Luminous reflectance | 0.30% | 0.50% | 0.47% | 0.60% | 0.50% | 1.50% |
| $T_{min}$ | 89.50% | 87.00% | 88% | 82% | 82% | 87% |
| $\lambda_{max}$ | 790 nm | 800 nm | 800 nm | 950 nm | 950 nm | 1,050 nm |

All the antireflective film-attached transparent substrates of Examples 1 to 3 have a luminous reflectance of the antireflective film being 1% or lower, and have the maximum value of the reflectance in the wavelength range of from 750 nm to 900 nm in the reflection spectrum of the wavelength range of from 450 nm to 950 nm. In addition, the antireflective film-attached transparent substrates of Examples 1 to 3 have a transmittance being 85% or higher over the whole wavelength range of from 700 nm to 950 nm.

Use of such an antireflective film-attached transparent substrate can increase visibility of a display apparatus, and can also enhance sensitivity of an IR sensor.

On the other hand, although the antireflective film-attached transparent substrates of Comparative Examples 1 and 2 have a luminous reflectance of the antireflective film being 1% or lower, but they do not have the maximum value of the reflectance in the wavelength range of from 750 nm to 900 nm in the reflection spectrum of the wavelength range of from 450 nm to 950 nm. In addition, these antireflective film-attached transparent substrates have a transmittance being not always 85% or higher at the wavelength range of from 700 nm to 950 nm.

Use of such an antireflective film-attached transparent substrate can increase visibility of the display apparatus, but may decrease sensitivity of the IR sensor.

Moreover, the antireflective film-attached transparent substrate of Comparative Example 3 does not have the maximum value of the reflectance in the wavelength range of from 800 nm to 900 nm in the reflection spectrum of the wavelength range of from 450 nm to 950 nm. The antireflective film-attached transparent substrate of Comparative Example 3 has a transmittance being 85% or higher over the whole wavelength range of from 700 nm to 950 nm, but has a luminous reflectance of the antireflective film being higher than 1%.

Use of such an antireflective film-attached transparent substrate can enhance sensitivity of the IR sensor, but may decrease visibility of the display apparatus.

Although the present invention has been described in detail and by reference to the specific embodiments, it is apparent to one skilled in the art that various modifications or changes can be made without departing the spirit and scope of the present invention.

This application is based on Japanese Patent Application (No. 2017-175576) filed on Sep. 13, 2017, the disclosures of which are incorporated herein by reference in their entities.

DESCRIPTION OF REFERENCE NUMERALS AND SIGNS

10: Antireflective film-attached transparent substrate
20: Transparent substrate
40: Antireflective film
41a, 41b: High refractive index layer
42a, 42b: Low refractive index layer
100: Vehicle-mounted display apparatus
110: LCD
120: Cover glass
130, 230: Pressure-sensitive adhesive layer
140, 240: Antireflective film
150, 250: Light-blocking layer
160: Optical Sensor
200: Display apparatus
210: Display panel
220: Transparent substrate
260: IR sensor
270: Antireflective film-attached transparent substrate

What is claimed is:

1. An antireflective film-attached transparent substrate, comprising a transparent substrate having first and second principal surfaces and an antireflective film on the first principal surface of the transparent substrate,
    wherein the antireflective film has a luminous reflectance being 1% or lower,
    wherein the antireflective film-attached transparent substrate has a transmittance being 85% or higher over the whole wavelength range of from 700 nm to 950 nm and has a reflectance being maximum in a wavelength range of from 750 nm to 900 nm in a reflection spectrum of a wavelength range of from 450 nm to 950 nm,
    wherein the antireflective film has a multilayer structure consisting of a high refractive index layer and a low refractive index layer provided alternately up to from four to ten layers in total, wherein within the multilayer structure the high refractive index layer and the low refractive index layer are in direct physical contact with each other,
    wherein the antireflective film-attached transparent substrate further comprises an antifouling film as the outermost layer, and the antifouling film comprises a fluorine-containing organosilicon compound,
    wherein the outermost layer of the multilayer structure is a $SiO_2$ layer and the antifouling film is in direct physical contact with the $SiO_2$ layer, and
    wherein each of the high refractive index layers and the low refractive index layers mainly comprises at least one oxide selected from the group consisting of oxides of Si, Nb, Ti, Zr, Ta, Al, Sn, and In, or mainly comprises at least one nitride selected from the group consisting of nitrides of Si and Al.

2. The antireflective film-attached transparent substrate according to claim 1,
    wherein each of the high refractive index layers is a layer mainly comprising an oxide of Nb, and
    wherein each of the low refractive index layers is a layer mainly comprising an oxide of Si.

3. The antireflective film-attached transparent substrate according to claim 1,
    wherein the transparent substrate is a glass substrate.

4. The antireflective film-attached transparent substrate according to claim 3,
    wherein the glass substrate is a chemically-strengthened glass substrate.

5. The antireflective film-attached transparent substrate according to claim 3,
    wherein the glass substrate has an antiglare layer on the first principal surface of the glass substrate, and the antireflective film is on the antiglare layer.

6. The antireflective film-attached transparent substrate according to claim 1,
    further comprising a light-blocking layer on a peripheral edge of the second principal surface of the transparent substrate,
    wherein at least a part of the light-blocking layer has a region with an internal transmittance being 80% or higher at a wavelength range of from 800 nm to 950 nm.

7. A display apparatus comprising:
    the reflective film-attached transparent substrate as described in claim 1,
    an infrared-ray sensor, and
    a display panel.

* * * * *